Feb. 11, 1947.　　　E. E. SPRAGUE　　　2,415,611

BALL BEARING ROLLER

Filed July 17, 1944

Inventor
Earl E. Sprague
By Liverance and
Van Antwerp
Attorneys

Patented Feb. 11, 1947

2,415,611

UNITED STATES PATENT OFFICE 2,415,611

BALL-BEARING ROLLER

Earl E. Sprague, Grand Rapids, Mich., assignor to Raymond J. Scheffler, Grand Rapids, Mich.

Application July 17, 1944, Serial No. 545,259

2 Claims. (Cl. 301—5.7)

This invention relates to an anti-friction bearing, and more particularly to a novel construction of anti-friction bearing which is self-lubricating, being provided with a chamber which may be filled with lubricant, with a provision of a simple and practical means to prevent loss of the lubricant so that it is not wasted, and the bearings remain relatively clean and are not covered in whole or in part by escaping lubricant.

Figure 1:
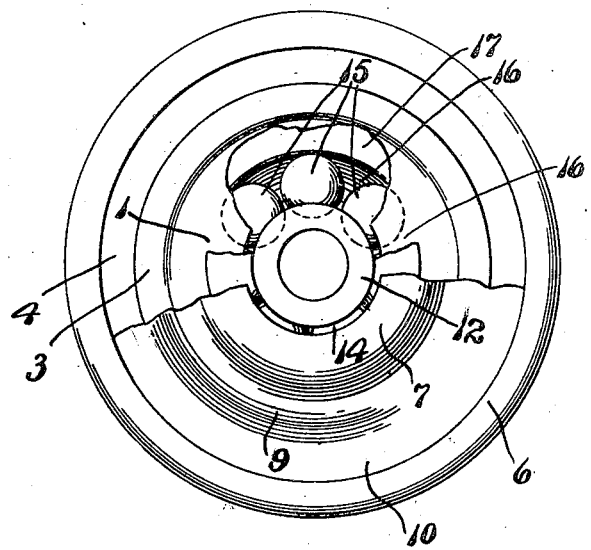
Figure 2:
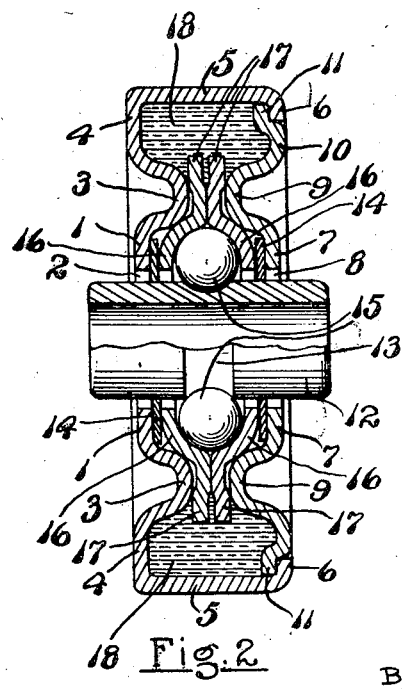

It is an object and purpose of the present invention to provide an anti-friction bearing of the type indicated which is of an economical and practical structure and which may be made in large quantities at low cost. The invention may be understood from the following description, taken in connection with the accompanying drawing, in which, Fig. 1 is a side elevation of the bearing structure of my invention, parts being broken away for interior disclosure, and Fig. 2 is a central vertical section through the complete bearing.

Like reference characters refer to like parts in the figures of the drawing.

In the construction as shown, the bearing housing is formed of two parts, each of flat metal. One of said parts has a vertical central circular section 1 with a central opening 2 therethrough, and beyond the center section 1 the metal is pressed inwardly to form a substantially U-shaped rib 3, which is continued as an annular section 4 to the outside of the housing, said annular section 4 at its outer edges being turned at right angles to form a continuous annular rim 5 which terminates in an inturned lip 6 as best shown in Fig. 2. The opposite part of the housing has a similar central circular section 7 with a central opening 8 through it, and an inwardly pressed annular rib 9 substantially duplicating in all respects the parts 1 and 3 and the opening 2 in the first described part or side of the housing. Beyond the rib 9 the metal is continued as an annular section 10 which terminates in an inwardly pressed continuous lip 11 within the inturned annular lip 6.

A sleeve 12 passes through the openings 2 and 8 of the housing and substantially midway between its ends has a continuous groove 13 of concave form as shown. Within the central circular sections 1 and 7 flat lubricant retainers 14 are located, each having a central opening of substantially the same diameter as the outer diameter of the sleeve 12 so as to snugly fit thereagainst.

Anti-friction balls 15 are disposed around the sleeve 12 seating in the groove 13, and as many of the balls are used as may be required to surround the sleeve with the balls closely adjacent to each other. Two ball retainers are provided, each made from a circular plate of flat metal stamped or pressed outwardly at their central portions to provide the curved sections 16 which bear against the outer portions of the balls 15, from which flanges 17 extend outwardly lying between the ribs 3 and 9. Said ball retainers also have central openings therethrough larger in diameter than the exterior diameter of the sleeve 12, through which the sleeve passes.

In the construction as described, when the parts are assembled and secured together by the spinning or other equivalent inward turning of the lip 6 against the edge of lip 11, as shown, a continuous chamber at the outer portions of the housing is provided which is adapted to be wholly or partially filled with lubricant indicated at 18. Preferably the outer portions of the flanges 17 will be spaced apart for a short distance for the free entrance of lubricant and, as shown in Fig. 2, there are spaces provided between the inner sides of the ribs 3 and 9 and the adjacent portions of the flanges 17. With this construction the lubricant tends to move inwardly between the ball retainers to the balls 15 and outside of the ball retainers and within the lubricant sealing members 14, supplying ample and sufficient lubricant for the balls as they turn about the sleeve 12, yet sealing against the escape of lubricant. The sleeve 12 having a longitudinal opening through it from one end to the other is adapted to be placed over and secured to a shaft or spindle around which the housing may rotate, or, reversely, the housing may remain fixed and a shaft or spindle passed through and secured to the sleeve 12 may rotate by reason of the anti-friction bearings within which the sleeve 12 is located.

The construction described is readily and easily manufactured, largely from stampings of flat metal, while the remaining parts are readily produced. The lubricant 18 filling the continuous chamber within the housing is sufficient to supply lubricant normally required for the life of the bearing.

The invention is defined in the appended claims and is to be considered comprehensive of all forms of structure coming within their scope.

I claim:

1. A bearing comprising, a central shaft member having a cylindrical outer surface, anti-friction balls around said member, ball retainers one at each side of the balls, said ball retainers having outwardly extending flanges, the inner sides of which are in engagement, said central member passing through the retainers, lubricant seals around said central member and through which said member passes, one at the outer side of each ball retainer, said seals closely engaging the surfaces of the central member, and a housing surrounding said ball retainers and seals, said housing having spaced sides through the central portion of which said central member passes and between which and the ball retainers the lubricant seals are positioned, said housing around the flanges of the ball retainers having a chamber to be filled with lubricant.

2. A construction having the elements defined in claim 1, said sides of the housing being formed with inwardly pressed annular ribs around the central portion thereof, said ribs engaging against the outer sides of the flanges of the ball retainers.

EARL E. SPRAGUE.

REFERENCES CITED

The following references are of record in the file of this patent:

UNITED STATES PATENTS

| Number | Name | Date |
| --- | --- | --- |
| 1,021,362 | Everett | Mar. 26, 1912 |
| 1,110,360 | Ware | Sept. 15, 1914 |
| 1,274,078 | Printz | July 30, 1918 |
| 1,347,777 | Hennum | July 27, 1920 |
| 1,429,158 | Morton | Sept. 12, 1922 |
| 1,674,087 | Beemer | June 19, 1928 |